US012664746B2

(12) United States Patent

Seneviratne et al.

(10) Patent No.: US 12,664,746 B2
(45) Date of Patent: Jun. 23, 2026

(54) AUGMENTED REALITY VISUALIZATION OF DETECTED DEFECTS

(71) Applicant: Wichita State University, Wichita, KS (US)

(72) Inventors: Waruna Seneviratne, Wichita, KS (US); John Tomblin, Wichita, KS (US); Tharaka Nandakumara, Wichita, KS (US)

(73) Assignee: WICHITA STATE UNIVERSITY, Wichita, KS (US)

( * ) Notice: Subject to any disclaimer, the term of this patent is extended or adjusted under 35 U.S.C. 154(b) by 127 days.

(21) Appl. No.: 18/584,880

(22) Filed: Feb. 22, 2024

(65) Prior Publication Data

US 2024/0282068 A1 Aug. 22, 2024

Related U.S. Application Data

(60) Provisional application No. 63/486,260, filed on Feb. 22, 2023.

(51) Int. Cl.
    *G06T 19/20*     (2011.01)
    *G06K 7/14*     (2006.01)
    *G06T 7/00*     (2017.01)

(52) U.S. Cl.
    CPC ........... *G06T 19/20* (2013.01); *G06K 7/1413* (2013.01); *G06T 7/0004* (2013.01); *G06T 2200/24* (2013.01); *G06T 2207/20092* (2013.01); *G06T 2207/30108* (2013.01); *G06T 2219/2004* (2013.01)

(58) Field of Classification Search
    CPC ... G06T 19/20; G06T 7/0004; G06T 2200/24; G06T 2207/20092; G06T 2207/30108; G06T 2219/2004; G06K 7/1413
    See application file for complete search history.

(56) References Cited

U.S. PATENT DOCUMENTS

| | | | |
|---|---|---|---|
| 10,899,089 B2 | 1/2021 | Webb | |
| 12,165,387 B2 | 12/2024 | Blom-Schieber et al. | |
| 12,205,270 B2 | 1/2025 | Winfree et al. | |
| 2018/0350055 A1* | 12/2018 | Cardenas Bernal | .... G06F 30/15 |

(Continued)

FOREIGN PATENT DOCUMENTS

EP      3628473 B1      2/2022

OTHER PUBLICATIONS

Unity Manual (NPL), Unity Technologies, "Important Classes—GameObject", 2023. (Year: 2022).*

(Continued)

*Primary Examiner* — Daniel F Hajnik
*Assistant Examiner* — Adeel Bashir
(74) *Attorney, Agent, or Firm* — Stinson LLP

(57) ABSTRACT

A defect visualization system includes an augmented reality viewing device including a display, and a visualization module configured to receive defect data representative of the defects on the part, determine a position of the augmented reality viewing device in relation to the part, generate one or more display objects, wherein each display object of the display objects corresponds to a respective defect of the defects, and present the display objects on the display so that the display objects appear in alignment with the defects on the part.

20 Claims, 7 Drawing Sheets
(4 of 7 Drawing Sheet(s) Filed in Color)

(56)          References Cited

U.S. PATENT DOCUMENTS

2019/0311469 A1 *  10/2019  Afrasiabi ................ G06T 7/001
2022/0118624 A1      4/2022  Tyson, II

OTHER PUBLICATIONS

Perla, Gupta, Hebbalaguppe, Hassan, "InspectAR: An Augmented
Reality Inspection Framework for Industry", 2016. (Year: 2016).*
Olson, "AprilTag: A robust and flexible visual fiducial system",
2011. (Year: 2011).*
VuMarks (NPL), Vuforia (PTC), "VuMarks", 2018. (Year: 2018).*
Jegley, Harik, Grenoble, Halbritter, Munden, Mason, "Hybrid AFP/
Hand Layup Optimized Blades to Enhance Wind Tunnel Capability—
Summary of PREDICT 2018 Efforts", 2020. (Year: 2020).*
Joshua Cemenska, Todd Rudberg, Michael Henscheid, "Automated
In-process inspection system for AFP machines", Journal, Sep. 15,
2015, 7 pages, 8(2):303-309, SAE International.
Christopher Sacco, Anis Bas Radwan, Ramy Harik, Michael Van
Tooren, "Automated fiber placement defects: automated inspection
and characterization", May 21, 2018, Article, 13 pages, McNair
Center for Aerospace Innovation and Research, Department of
Mechanical Engineering, College of Engineering and Computing,
University of South Carolina, 1000 Catawba St., Columbia, SC,
29201, USA.
Mathew Godbold, Christopher Sacco, Roudy Wehbe, "An End-To-
End AFP Defect Inspection and Analysis Tool", Conference Paper,
Jan. 2022, 12 pages, DOI:10.33599/nasampe/s.22.0729, ResearchGate.
"Ingersolls ACSIS: Automated Composite Structure Inspection Sys-
tem", Video, May 15, 2019, 3:35 minutes, Ingersoll Machine Tools.

* cited by examiner

600

AUGMENTED REALITY VISUALIZATION OF DETECTED DEFECTS

CROSS-REFERENCE TO RELATED APPLICATION

This application claims priority to U.S. Provisional Patent Application No. 63/486,260 filed Feb. 22, 2023, which is hereby incorporated by reference in its entirety.

FIELD

This disclosure generally pertains to inspection systems and more particularly to the visualization of defects detected via an in-process automated fiber placement (AFP) manufacturing inspection system (IAMIS).

BACKGROUND

Automated fiber placement (AFP) is a composite manufacturing technique used to fabricate complex advanced air vehicle structures that are lightweight with superior qualities. The AFP process is intricate and complex with various phases of design, process planning, manufacturing, and inspection. The AFP process consists of a gantry/robotic system with an attached fiber placement head. The AFP head enables multiple strips of composite material, or tows, to be laid onto a tool surface. Adhesion between the incoming tows and substrate is ensured by using appropriate process conditions such as heating, compaction, and tensioning systems. A series of tows forms a course, courses are then combined to create a ply, and multiple plies create a laminate.

Although AFP has significantly improved the production rate and quality of laminate structures, the integration of multiple disciplines such as robotics, nondestructive inspection (NDI), and process modeling presents challenges. As the tows from multiple spools are laid down, a wide variety of defects, such as gaps, overlaps, missing tows, twisted tows, puckers or wrinkles, foreign object debris (FOD), cumulative defects, and fiber bridging may be present. Since these defects can have a significant impact on the structural margin of safety, it is important to detect and repair such defects. Quality assurance through inspections and process controls are essential to ensure that material is laid up and processed according to specification without process-induced defects. Currently, AFP processes are interrupted after each layer so that the layup can be manually inspected for defects. This manual inspection process can consume 20-70 percent of the total production time, which diminishes the benefits of automation that would otherwise improve the production rate. In addition, manual inspection processes depend heavily on operator skill and training.

Current industry standard for inspection is primarily visual/manual, which can be inconsistent and subject to human error. Although AFP significantly improves the production rate and quality, a lack of reliable in-process inspection techniques results in intermittent interruptions (20-70% of the production time) for manual inspections. In addition, manual inspection processes are very time intensive, require expert knowledge, and reduce traceability in determining the quality of layup. The time cost of manual inspection is significant, with inspection time growing with the size of each part. This makes producing large scale composites increasingly time and cost prohibitive. Moreover, due to low contrast between the substrate and incoming tows, visual identification of defects has proven to be difficult.

Although thermal imaging, laser profiling, eddy current inspection and other non-destructive testing (NDT) techniques have been employed to ease the difficulty of inspection, improved accuracy and speed of rapid in-process, or in-line, automated inspection is needed.

SUMMARY

In one aspect, a defect visualization system is provided for visualizing one or more defects on a part. The defect visualization system includes an augmented reality viewing device including a display, and a visualization module configured to receive defect data representative of the defects on the part, determine a position of the augmented reality viewing device in relation to the part, generate one or more display objects, wherein each display object of the display objects corresponds to a respective defect of the defects, and present the display objects on the display so that the display objects appear in alignment with the defects on the part.

In another aspect, a method is provided for visualizing one or more defects on a part constructed on a tool of an automated fiber placement system. The method includes receiving defect data representative of the defects on the part, determining a position of an augmented reality viewing device in relation to the part, generating one or more display objects, wherein each display object of the display objects corresponds to a respective defect of the defects, and presenting the display objects using the augmented reality viewing device so that the display objects appear in alignment with the defects on the part.

In yet another aspect, a method is provided visualizing one or more defects on a part constructed on a tool of an automated fiber placement system. The method includes scanning at least one scannable locator on the tool with an augmented reality viewing device, the augmented reality viewing device in communication with a visualization module, utilizing a location of the scannable locator to determine a position of the augmented reality viewing device in relation to the part, retrieving defect data representative of the defects on the part, and generating one or more display objects for presentation on a display of the augmented reality viewing device, wherein each display object of the display objects corresponds to a respective defect of the defects so that the display objects appear in alignment with the defects on the part.

Other aspects will be in part apparent and in part pointed out hereinafter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Corresponding parts are given corresponding reference characters throughout the drawings.

DETAILED DESCRIPTION

This disclosure generally pertains to inspection systems and, more particularly, to the visualization of defects detected via an in-process automated fiber placement (AFP) manufacturing inspection system (IAMIS). The IAMIS may be used with AFP systems of the type used to form composite parts by using an automated robotic system including a fiber application head to apply strips of fibers to a molding in strip-by-strip fashion. The strips of fiber are commonly referred to as tape or tows. Commercially, these types of AFP systems are available from Coriolis Composites SAS, Electroimpact Inc., and Mikrosam, for example. Those skilled in the art will recognize that, in comparison with conventional composite manufacturing systems, AFP systems can automate the manufacture of more complex and intricate parts as they allow for a much greater degree of control over how fibers are laid up in the composite.

In some examples, the IAMIS is used to provide in-situ inspection of defects. To increase AFP production rates to match their potential, examples described herein include a visualization system for use with the IAMIS. The visualization system may be used to visualize one or more defects on a part identified by non-destructive testing. In some examples, the visualization system includes an augmented reality (AR) viewing device and a visualization module that allows the defects to be visualized. The visualization system determines a position of the AR viewing device in relation to the part, before displaying each defect in virtual three-dimensional space (e.g., in an AR environment) according to their location in real three-dimensional space (e.g., in a real-world environment). In some examples, a scannable locator on the tool is scanned, and the position of the AR viewing device is determined in relation to the part. The AR viewing device may then retrieve defect data to display each defect in alignment with the location of the corresponding defect on the part.

Figure 1:
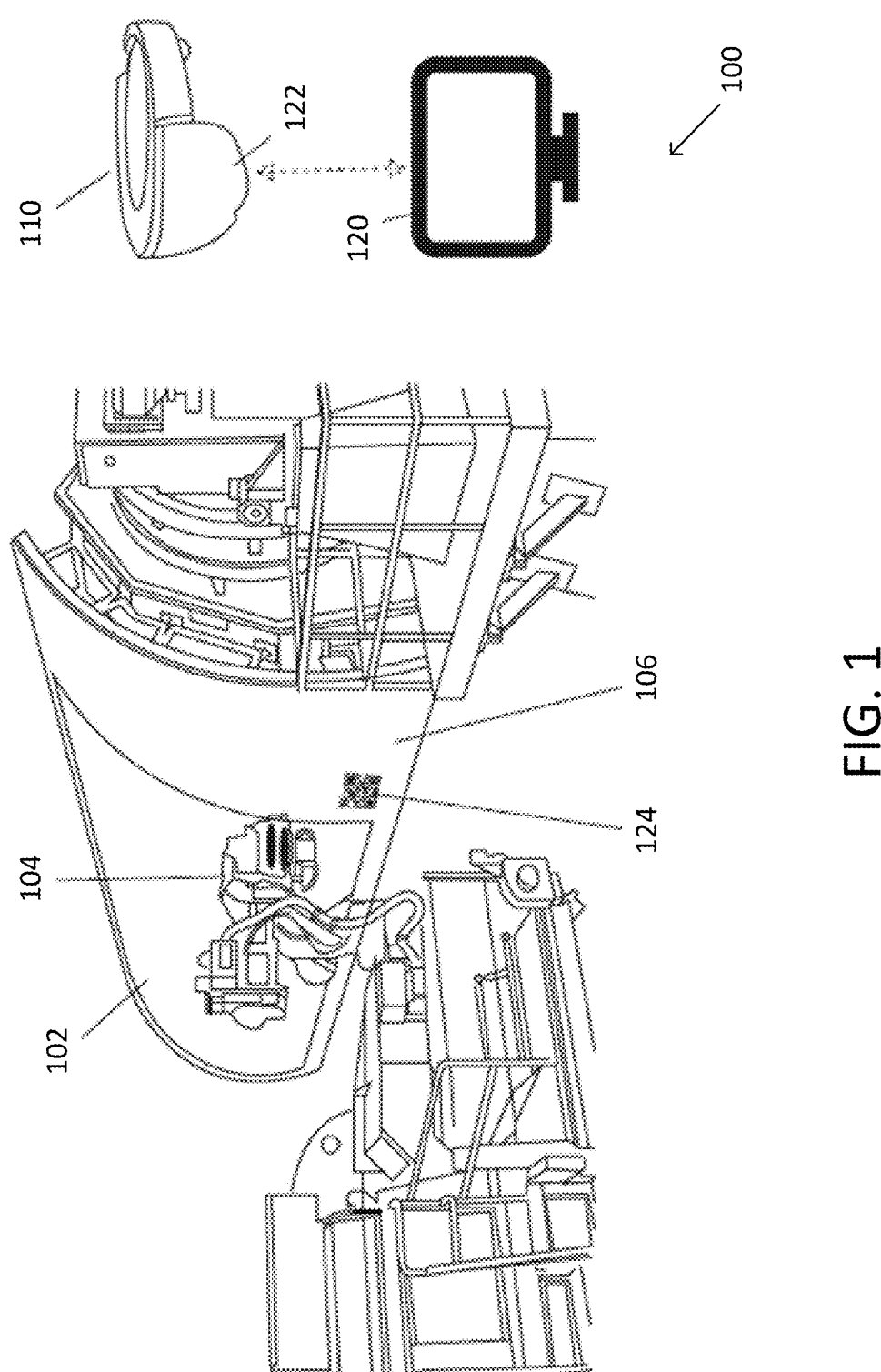
FIG. 1 is a diagram of an example defect visualization system.

FIG. 1 shows of an example defect visualization system 100 for use in visualizing one or more defects on a part 102 constructed by an automated fiber placement (AFP) system 104. As shown in FIG. 1, the part 102 may be constructed on a tool 106 of the AFP system 104. The defect visualization system 100 includes an augmented reality (AR) viewing device 110 and a visualization module 120. The defect visualization system 100 may use an IAMIS Viewer application as developed for the purpose of visualizing defects. Broadly speaking, the IAMIS viewer may import a defect list generated by an IAMIS defect detection system. The defect list may identify a defect type, a contour, and/or a location of detected defects. The IAMIS viewer may then visualize the defect on the real-world part 102 using the augmented reality viewing device 110.

In some examples, the AR viewing device 110 projects or presents one or more defects using a display 122 such that the user can view the defects on the real-world part 102 as the user physically moves around the real-world part 102. The AR viewing device 110 may include one or more of a tablet, a mobile device, and/or a headset. For example, a HoloLens headset as produced by Microsoft Corporation may be a suitable headset for use within the present disclosure. However, other headsets or AR viewing devices may be used without departing from the scope of the present disclosure.

The AR viewing device 110 may include a scanning device that is configured to scan a scannable locator 124. As shown in FIG. 1, the scannable locator 124 may be a barcode, such as a Quick Response (QR) code. In some examples, receiving defect data is initiated by scanning the scannable locator 124, which may be unique to each part 102. For example, the user may use the AR viewing device 110 to look closely at the scannable locator 124, and the defect data regarding that part 102 will be received by the visualization module 120.

It should be known that although some examples described herein utilize a QR code, any scannable locator or readable indicator may be used without departing from the scope of the present disclosure. For example, a one-dimensional barcode, a data matrix code, a radio-frequency identification (RFID) tag, and/or near-field communication (NFC) tag may be used within the current disclosure. In other examples, a unique scannable locator may be entered in order to populate detected defect data.

Figure 2:
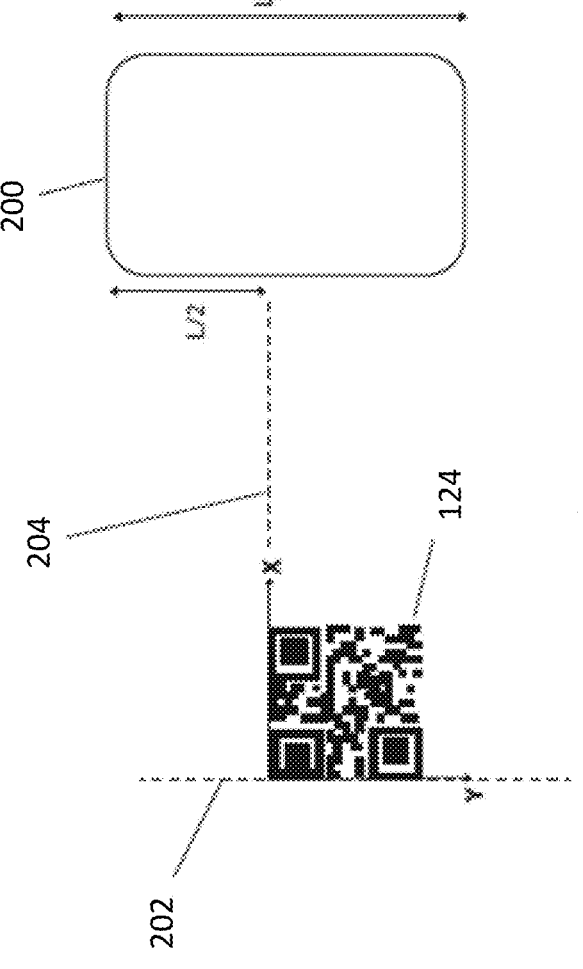
FIG. 2 is a diagram of an example scannable locator and an automated fiber placement (AFP) roller.

FIG. 2 shows an example scannable locator 124 and an AFP roller 200. The scannable locator 124 may be physically located at a predetermined location, such as on the surface of the tool 106, integrated into the tool 106, and/or at an edge of the part 102 on the tool 106. In some examples, the scannable locator 124 is visible at each stage of the layup. In this manner, the scannable locator 124 may be used as a location reference. For example, a position of the AR viewing device 110 in relation to the part 102 may be determined by utilizing the scannable locator 124 as a location reference. The location reference may serve as an origin or virtual reference feature for establishing the relationship of the location of the defects to be displayed to the actual part 102, so that the displayed defects appear in alignment with the location of a corresponding defect on the part 102. When the AR viewing device 110 scans the scannable locator 124, an exact location of the scannable locator 124 in a reference frame of an AFP robot program for the tool 106 is recorded, which formulates a transformation matrix. In some examples, the exact location is recorded in a X, Y, Z, A, B, C format. The AR viewing device 110 uses the origin of the scannable locator 124 as its own origin for defect mapping. The AFP robot program may use its own origin, separate from the origin of the AR viewing device 110. Using the transformation matrix, the IAMIS viewer converts the defect location points recorded in the robot's reference frame to the scannable locator reference frame.

In some examples, the x-axis of the scannable locator 124 is parallel to the x-axis of an AFP robot program before the robot is used for AFP layup or in-process inspection, and the y-axis of the scannable locator 124 coincides or overlaps with a laser line 202 from a profilometer, which is a part of the IAMIS defect detection system. As shown in FIG. 2, the origin of the scannable locator 124 may be placed along a center line 204 of the AFP roller 200. In some examples, a second scannable locator may be placed on a distal end of the tool 106 such that the x-axis of the second scannable locator is also parallel to the x-axis of the AFP robot program.

The visualization module 120 has a default setting to monitor for scannable locators 124. As long as this setting has not been manually changed by the user, once the scannable locator 124 is scanned, the visualization module 120 is configured to generate a scannable locator game object. As used herein, the term "game object" may refer to a building block within the structure or organization of the AFP robot program. For example, a game object may represent an entity or element within the AR environment that can be manipulated, interacted with, and/or rendered on the display 122. Game objects may encompass a wide range of entities or elements, including characters, items, obstacles, textures, and/or special effects. Each game object may be associated with one or more properties, behaviors, and/or attributes that define its characteristics and functionality within the AR environment, such as its position, size, shape, appearance, movement, and/or relationship with another game object.

Once created, the scannable locator game object is assigned all of the same values which were previously assigned to its corresponding real-world scannable locator 124. In some examples, the values assigned to both the scannable locator 124 and its corresponding game object include coded text, a timestamp, and size. The visualization module 120 then moves the generated scannable locator game object, existing in the AR environment, to match the location of the real-world scannable locator 124 so that they overlap.

Figure 3:
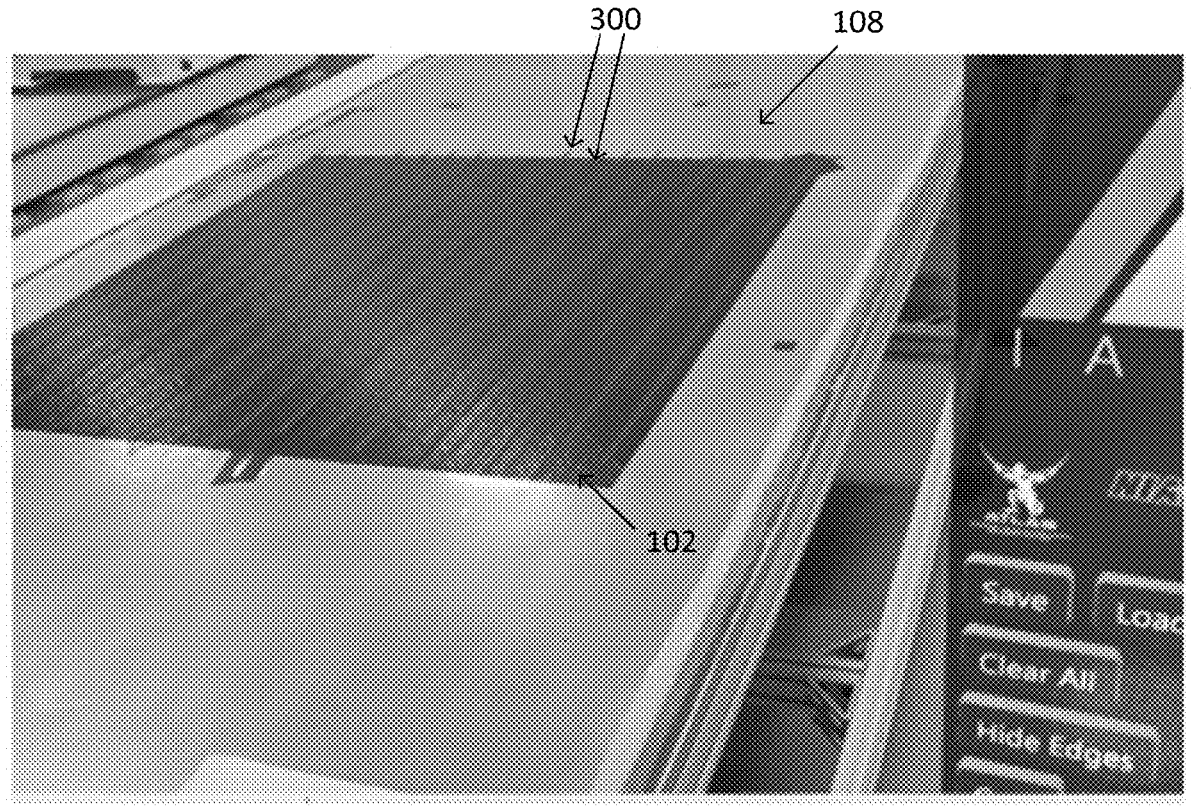
FIGS. 3 and 4 are images of parts with detected defects as viewed through an augmented reality viewing device.
Figure 4:
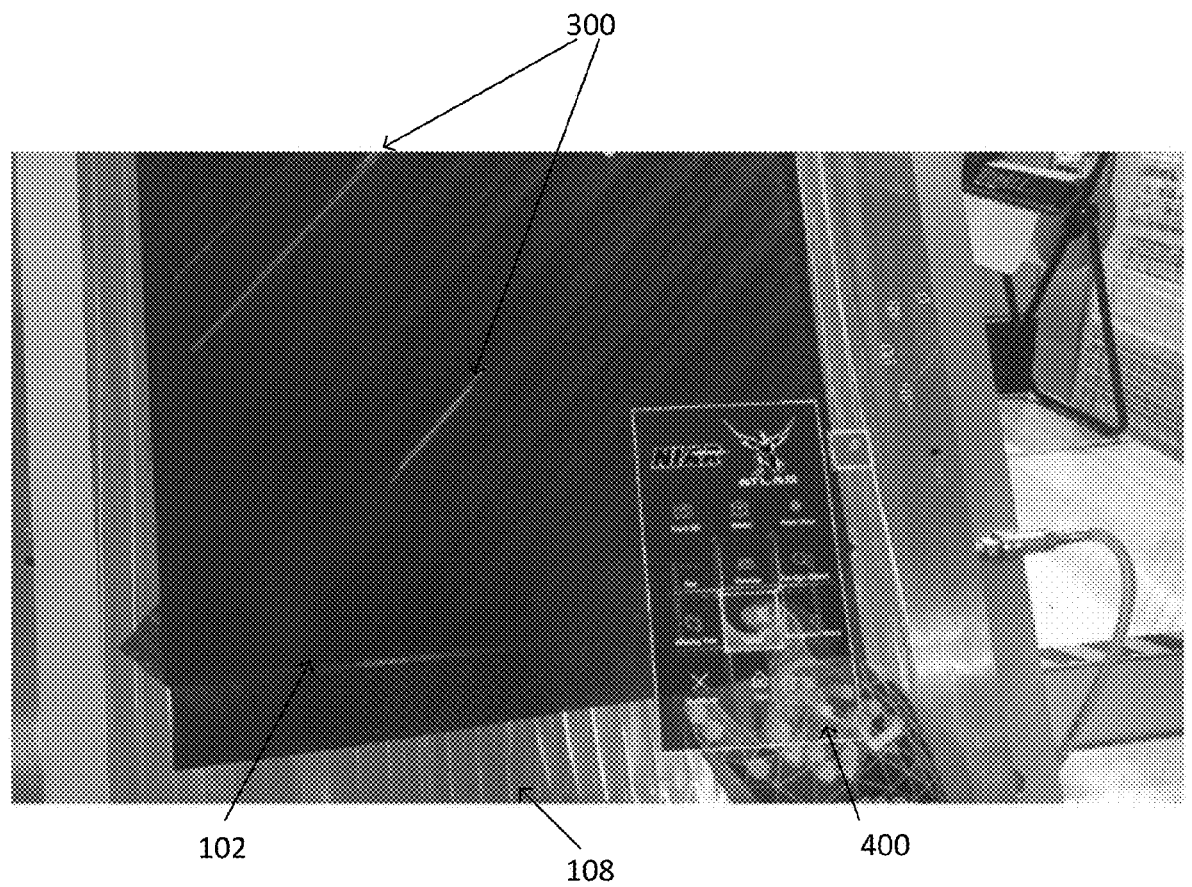

FIGS. 3 and 4 show views of a user as they view parts 102 with defects through the AR viewing device 110. The visualization module 120 generates a display object 300 for each of the defects and communicates with the AR viewing device 110 to present or display the display object 300 for each of the defects using the display 122. In this manner, the AR viewing device may allow a user to visualize at least one of a number of defects created or caused by the AFP system 104. Using the AR viewing device 110, the user is able to visualize one or more defects within an AR environment. In some examples, the AR viewing device 110 presents or displays the display objects 300 so that the display objects 300 appear in alignment with the corresponding defects on the part 102.

As shown in FIG. 4, an AR touch menu 400 may be in view of the user as they make a touch selection to toggle through different types of defects. In some examples, a first color (e.g., red) may be used to visualize a first type of defect (e.g., a gap), and a second color (e.g., green) may be used to visualize a second type of defect (e.g., a missing tow). The display objects 300 may be overlaid onto the areas of real-world defects on the part 102. Alternatively, the detected defects may be projected onto a virtual part created within a virtual environment. This way, a user can view the defects on the part 102 without having to be in the same room as the real-world part 102.

To generate a display object 300, the visualization module 120 may spawn a part model by adding a computer-aided-design (CAD) or other three-dimensional file (e.g., an STL file) to the IAMIS viewer application's persistent data storage. In some examples, the part model is automatically uploaded if there is a STL file available along with a defect details text file (.txt file). However, the STL file may also be manually uploaded. A prefabricated asset (prefab) game object for the virtual model of the part 102 is then created. The prefab game object contains a transform component that controls its position and a mesh renderer that will hold the model. Then the virtual part model is added to the mesh renderer, and the transform of the object is matched with the transform of the scannable locator 124 that was scanned. This ensures that the virtual part model is at the same position and angle as the scannable locator game object.

In some examples, the .txt file containing the detected defect information is in the IAMIS viewer application's persistent data storage. From this .txt file, defect type and defect contour data points are retrieved and a new SplitLine object is created using this data. The SplitLine object may define a line or boundary within the AR environment. For each SplitLine object, a new corresponding prefab game object is created. This time, the prefab game object includes a line renderer component. The defect contour data points are assigned to the line renderer from SplitLine, which draws the line in three-dimensional space. The defect type is also addressed via a color assignment system which allocates different colors to different types of defects as shown in FIG. 4.

In some examples, the prefab game object has a child object containing a box collider, which is configured to detect each time a user touches the lines with their finger. The AR viewing device 110 is configured to be compatible with these touch interactions, which trigger the spawning of a text box that displays defect data retrieved from the text file. Once spawned, the text box and the displayed defect data are visible to the user of the AR viewing device 110.

In some examples, the visualization module 120 transforms the display object 300 relative to the position and orientation of the scannable locator 124 so that the detected defects are aligned with the scannable locator 124, as well as where the tool 106 is displayed. The defect visualization system shows the detected defects as display objects 300 in augmented reality located over the actual defects in the part 102, as shown in FIGS. 3 and 4.

Figure 5:
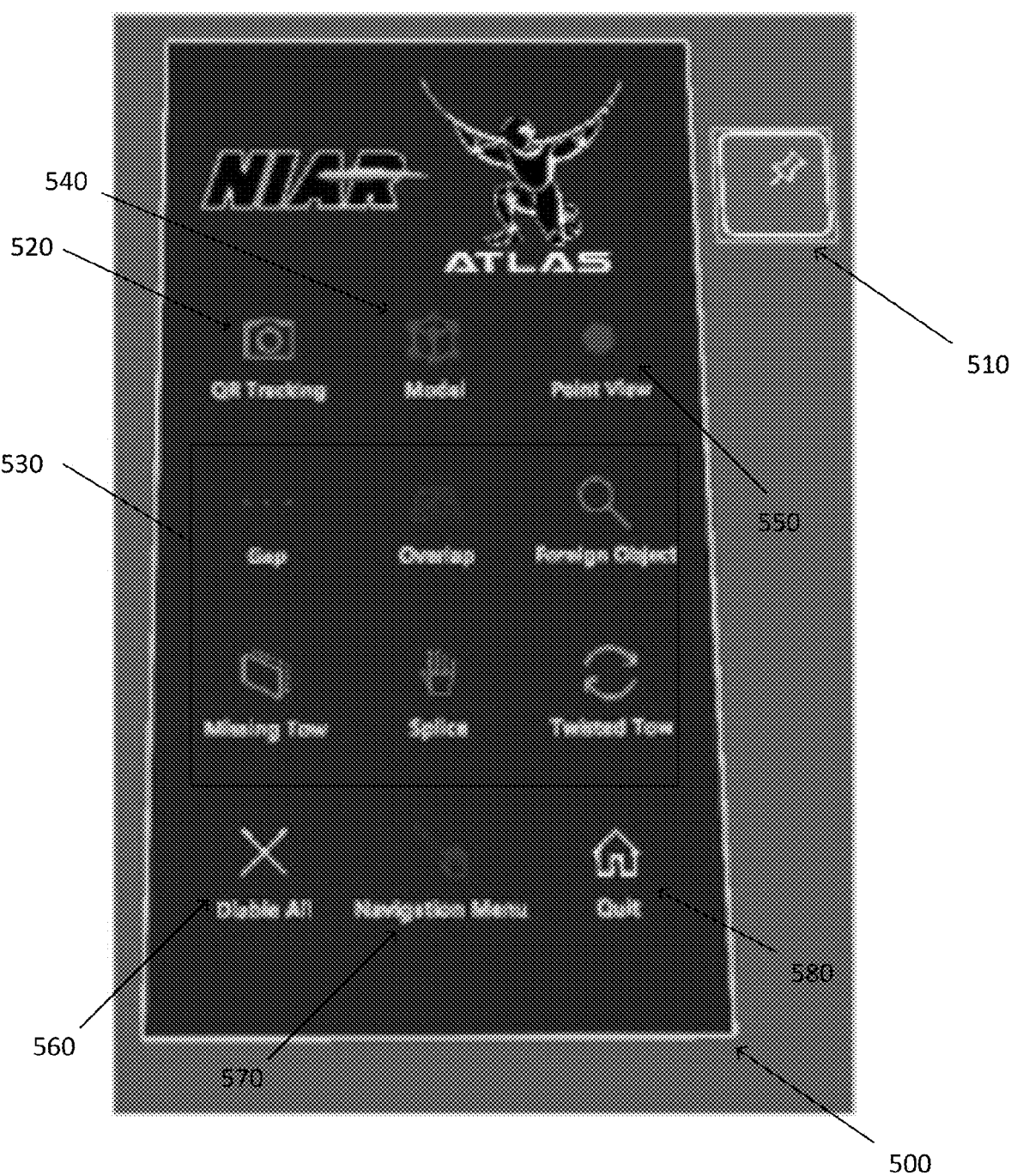
FIG. 5 is an image of a touch menu for the defect visualization system shown in FIG. 1.

FIG. 5 shows an example touch menu 500 (e.g., AR touch menu 400) including a plurality of virtual buttons that allow a user to modify the view of the AFP robot program. In some examples, the virtual buttons may be color coded according to their current status. For example, virtual buttons with a toggle function may be displayed in a first color (e.g., green) when enabled and in a second color (e.g., red) when disabled.

The touch menu 500 may follow the user in the AR environment as the user moves around the real-world environment. In some examples, the user may move the touch menu 500 in the AR environment (e.g., by pinching or "picking up" the touch menu 500 and dragging it). In some examples, a pin button 510 is displayed next to the touch menu 500 to allow user to maintain or "pin" the touch menu 500 in a fixed position within the AR environment, instead of follow the user as they move around the real-world environment.

The AR touch menu 500 may include a scannable locator tracking button 520 (shown in FIG. 5 as a "QR Tracking" button). In some examples, the scannable locator tracking button 520 is configured to disable all of the scannable locator game objects in the AR environment. This may be useful when the user no longer wants to see the visual overlay of the code, or if the user doesn't want to move them anywhere.

The AR touch menu 500 is in view of the user as they make a touch selection to toggle through the different types of detected defects. For example, as shown in FIG. 5, the virtual buttons may include one or more defect buttons 530, such as a "Gap" button, an "Overlap" button, a "Foreign Object" button, a "Missing Tow" button, a "Splice" button, and a "Twisted Tow" button. In some examples, the defect buttons 530 are configured to toggle the visibility of the corresponding defect in the AR environment. The defect buttons 530 may be color coordinated with the same color that is used to display that defect's lines/points (e.g., the color of the display object 300) when active and in another color (e.g., white) when inactive.

As shown in FIG. 5, the AR touch menu 500 may also include a model button 540, a point view button 550, a disable all button 560, a navigation menu button 570, and a quit button 580. The model button 540 may be used to selectively enable or disable the virtual part model. The point view button 550 may be used to toggle between a line-based view showing lines containing each defect in the file and a point-based view showing each point of each defect in the file. The disable all button 560 may be used to disable all of the defects, switch the menu back to point view, and/or hide the navigation menu. The quit button 580 may be used to open a dialog box asking the user if they wish to close the program.

Figure 6:
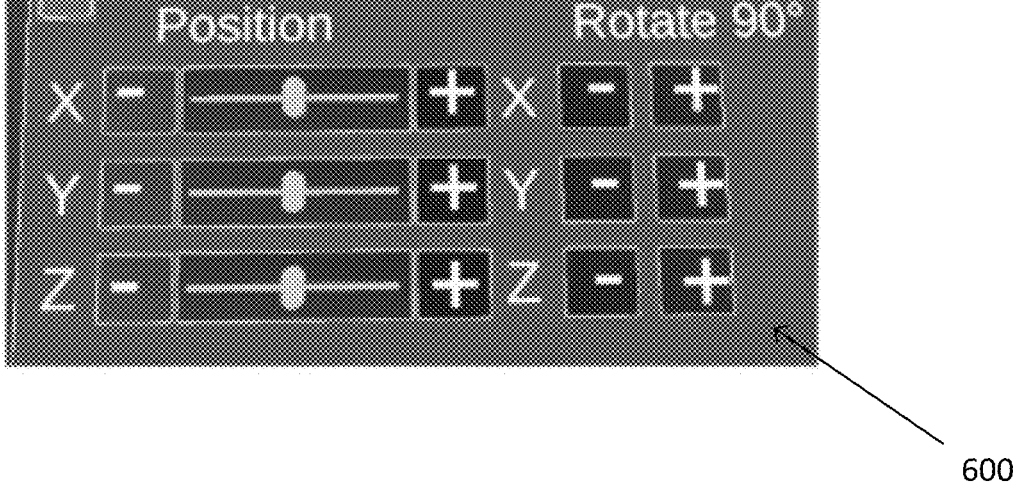
FIG. 6 is an image of a navigation menu for the defect visualization system shown in FIG. 1.

The navigation menu button 570 may be used to open a navigation menu 600, shown in FIG. 6. The navigation menu 600 may appear toward the side of the user's field of view and allow the user to manually adjust the position of game objects and/or display object 300 within the AR environment as shown in FIG. 6. The navigation menu 600 may include a plurality of sliders and buttons. In some examples, each axis (X, Y, Z) has a set of buttons and a slider. For positioning, the user can either pinch the slider to move the game objects and/or display object 300 or press the +/− buttons adjacent to the slider to make small adjustments. For rotation, pressing the +/− buttons applies a 90° rotation in the positive or negative direction.

In some examples, the view that the user sees while wearing the AR viewing device 110 may be mirrored onto a desktop computer, monitor, or alternative screen so that others in the room or at a remote location may view the inspection process. In some examples, the user view may be viewed on another type of AR viewing device 110 such as a mobile app, mobile device, or tablet.

Figure 7:
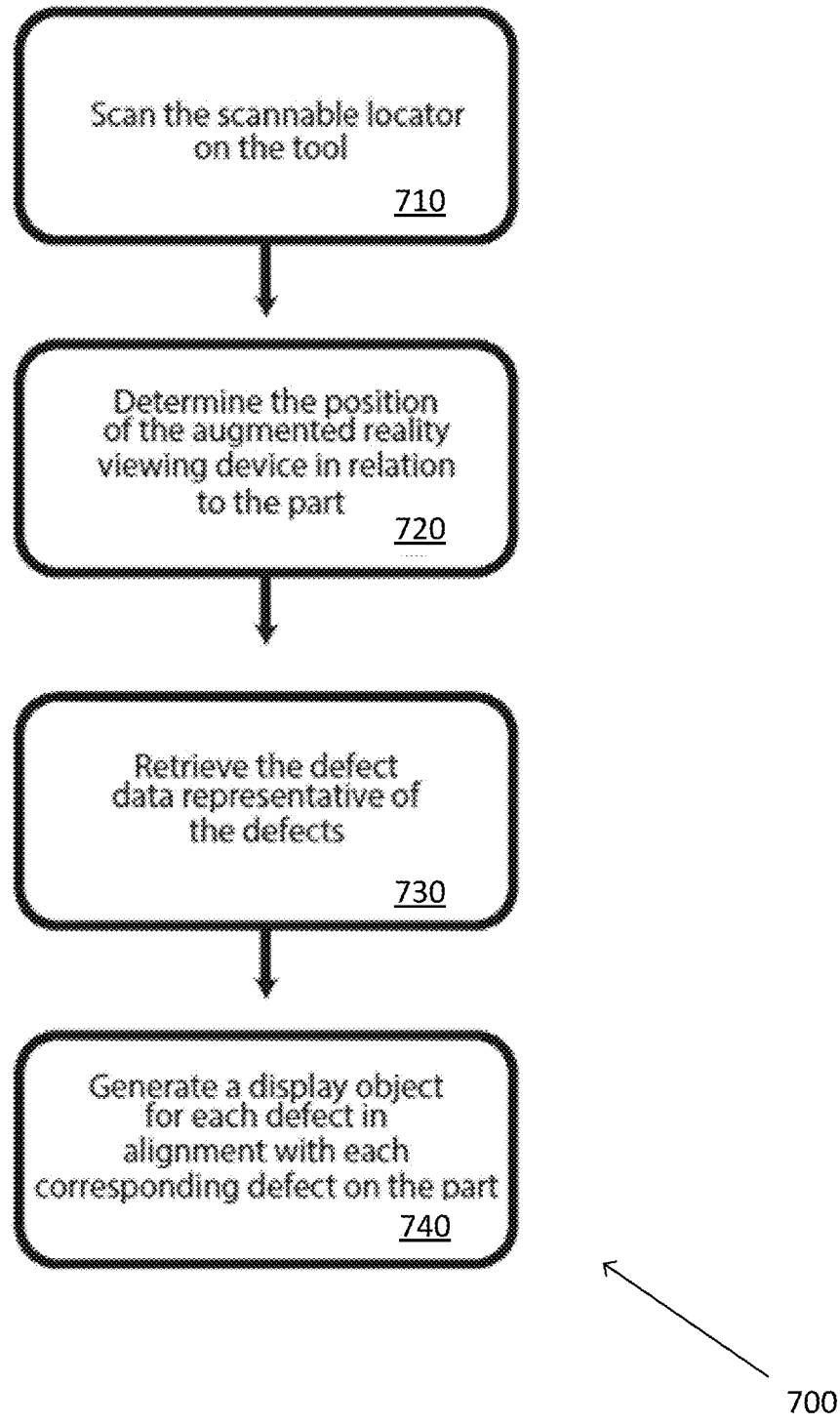
FIG. 7 is a flow chart illustrating an example method of visualizing one or more defects on a part constructed by an AFP system.

FIG. 7 shows an example method 700 of visualizing one or more defects on a part constructed by an AFP system. The method includes scanning at least one scannable locator 124 at operation 710. In some examples, scanning the scannable locator 124 occurs when a user uses the AR viewing device 110 to look at the scannable locator 124. The AR viewing device 110 is in communication with the visualization module 120.

The position of the AR viewing device 110 in relation to the part 102 is determined at operation 720. The scannable locator 124 may be used as a location reference to determine the position of the AR viewing device 110 in relation to the part 102. In some examples, a scannable locator game object may be generated based on the scanning of the scannable locator 124 on the tool 106. When this occurs, the scannable locator game object location may be matched with the location of the scannable locator 124 on the tool 106. The scannable locator 124 may also be used as an origin by the AR viewing device 110 to map detected defects.

Defect data that represents at least one of the defects on the part 102 may be retrieved at operation 730. In some examples, the defect data includes at least one defect type and a plurality of defect contour data points. The at least one defect type can be at least one of a gap, overlap, splice, twisted tow, missing tow, or foreign object debris (FOD). In some examples, the defect type and defect contour data points may be used to create a SplitLine object.

A display object 300 for each of the one or more defects is generated at operation 740. The display objects 300 may be presented on a display 122 of the AR viewing device 110 so that the display object 300 appears in alignment with the location of the actual defect on the part 102.

In some examples, the method includes initiating a virtual model game object based upon a virtual model of the part 102. The virtual model is loaded into the visualization module 120 either automatically or manually by a user. Once loaded, the scannable locator game object and the virtual model game object are correlated in virtual three-dimensional space. This correlation occurs by transforming the virtual model game object and the scannable locator game object, and then matching the transformed virtual game objects so that they are in the same position in virtual three-dimensional space. However, it should be clear that the steps of initiating a virtual model game object, and including a virtual model in the process in the first place are not required in order to achieve the goals of the present disclosure, as the system may function without the inclusion of each of these items.

In operation, processors, computers and/or servers may execute the processor-executable instructions (e.g., software, firmware, and/or hardware) such as those illustrated herein to implement aspects of the invention. The defect visualization system 100 may be used to visualize one or more defects on a part 102. For example, the defect visualization system 100 may create one or more game objects (e.g., display object 300) for a virtual model of the part 102 and position the one or more game objects in the AR environment. The defect visualization system includes an AR viewing device 110 including a display 122, and a visualization module 120 configured to receive defect data representative of one or more defects on the part 102, determine a position of the AR viewing device 110 in relation to the part 102, generate one or more display objects 300 corresponding to the one or more defects on the part 102, and presenting the one or more display objects 300 on the display 122 so that the one or more display objects 300 appear in alignment with the one or more defects on the part 102.

In some examples, each display object 300 may be selectable to allow defect data associated with the corresponding defect to be displayed. For example, the visualization module 120 may receive a selection of a first display object 300, determine first defect data representative of or associated with the first display object 300, and present the first defect data on the display 122. In some examples, each display object 300 is, includes, or is associated with one or more game objects. A display object 300 may be or include one or more SplitLine objects.

In some examples, the AR viewing device 110 includes a scanning device configured to scan a scannable locator 124 on the part 102. The scannable locator 124 may include, for example, a barcode (e.g., QR code). After the scannable locator 124 is scanned, the visualization module 120 may create a game object for the scannable locator 124 (e.g., a scannable locator game object) and position the game object in the AR environment.

Examples of the present disclosure may comprise a special purpose computer including a variety of computer hardware, as described in greater detail herein. For purposes of illustration, programs and other executable program components may be shown as discrete blocks. It is recognized, however, that such programs and components reside at various times in different storage components of a computing device, and are executed by a data processor(s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/ or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that the several objects of the disclosure are achieved and other advantageous results attained.

What is claimed is:

1. A method of visualizing one or more defects on a part constructed on a tool of an automated fiber placement system, the method comprising:

scanning at least one scannable locator on the tool with an augmented reality viewing device, the augmented reality viewing device in communication with a visualization module;

utilizing a location of the at least one scannable locator to determine a position of the augmented reality viewing device in relation to the part;

retrieving defect data representative of the one or more defects on the part; and generating one or more display objects for presentation on a display of the augmented reality viewing device, wherein each display object of the one or more display objects corresponds to a respective defect of the one or more defects so that the one or more display objects appear in alignment with the one or more defects on the part;

the method further comprising:

retrieving defect type data and defect contour data; and creating a SplitLine object based on the defect type data and defect contour data.

2. The method of claim 1, further comprising using an in-process automated fiber placement manufacturing inspection system to identify the defects on the part while manufacturing the part using the automated fiber placement system.

3. The method of claim 1, further comprising determining a position of the augmented reality viewing device in relation to the part.

4. The method of claim 1, wherein the scannable locator is directly on the tool.

5. The method of claim 1, wherein the defect data comprises a set of coordinate values defined in a coordinate system of the automated fiber placement system, and wherein generating the one or more display objects comprises transforming the set of coordinate values into a local coordinate system of the augmented reality viewing device.

6. The method of claim 1, wherein the defect data includes a defect type classification for each of the one or more defects, and wherein generating the one or more display objects comprises rendering distinct visual attributes based on the defect type classification.

7. A method of visualizing one or more defects on a part constructed on a tool of an automated fiber placement system, the method comprising:

scanning at least one scannable locator on the tool with an augmented reality viewing device, the augmented reality viewing device in communication with a visualization module;

utilizing a location of the at least one scannable locator to determine a position of the augmented reality viewing device in relation to the part;

retrieving defect data representative of the one or more defects on the part; and generating one or more display objects for presentation on a display of the augmented reality viewing device, wherein each display object of the one or more display objects corresponds to a respective defect of the one or more defects so that the one or more display objects appear in alignment with the one or more defects on the part;

the method further comprising:

generating a scannable locator game object based on the scanning of the at least one scannable locator on the tool; and matching a location of the scannable locator game object to the location of the at least one scannable locator on the tool.

8. The method of claim 7, further comprising using an in-process automated fiber placement manufacturing inspection system to identify the defects on the part while manufacturing the part using the automated fiber placement system.

9. The method of claim 7, further comprising determining a position of the augmented reality viewing device in relation to the part.

10. The method of claim 7, wherein the scannable locator is directly on the tool.

11. The method of claim 7, wherein the defect data comprises a set of coordinate values defined in a coordinate system of the automated fiber placement system, and wherein generating the one or more display objects comprises transforming the set of coordinate values into a local coordinate system of the augmented reality viewing device by utilizing the matched location of the scannable locator game object as a transformation origin.

12. The method of claim 7, wherein the defect data includes a defect type classification for each of the one or more defects, and wherein generating the one or more display objects comprises rendering distinct visual attributes based on the defect type classification.

13. A method of visualizing one or more defects on a part constructed on a tool of an automated fiber placement system, the method comprising:

scanning at least one scannable locator on the tool with an augmented reality viewing device, the augmented reality viewing device in communication with a visualization module;

utilizing a location of the at least one scannable locator to determine a position of the augmented reality viewing device in relation to the part;

retrieving defect data representative of the one or more defects on the part; and generating one or more display objects for presentation on a display of the augmented reality viewing device, wherein each display object of the one or more display objects corresponds to a respective defect of the one or more defects so that the one or more display objects appear in alignment with the one or more defects on the part;

the method further comprising:

loading a virtual model of the part onto the visualization module; and initiating a virtual model game object based on the virtual model of the part.

14. The method of claim 13, further comprising:

generating a scannable locator game object based on the scanning of the at least one scannable locator on the tool; and correlating the scannable locator game object and the virtual model game object in an augmented reality environment.

15. The method of claim 14, further comprising:

positioning the virtual model game object in a first location in the augmented reality environment; and positioning the scannable locator game object in the first location in the augmented reality environment.

16. The method of claim 13, further comprising using an in-process automated fiber placement manufacturing inspection system to identify the defects on the part while manufacturing the part using the automated fiber placement system.

17. The method of claim 13, further comprising determining a position of the augmented reality viewing device in relation to the part.

18. The method of claim 13, wherein the scannable locator is directly on the tool.

19. The method of claim 13, wherein the defect data comprises a set of coordinate values defined in a coordinate system of the automated fiber placement system, and wherein generating the one or more display objects comprises transforming the set of coordinate values into a local coordinate system of the augmented reality viewing device.

20. The method of claim 13, wherein the defect data includes a defect type classification for each of the one or more defects, and wherein generating the one or more display objects comprises rendering distinct visual attributes based on the defect type classification.

* * * * *